July 28, 1925.

H. K. INMAN ET AL 1,547,218

BRAKE LINING

Filed May 14, 1923

Inventors:
Harry K. Inman &
John J. Johnson.
By Franks Anderman.
Attorney

Patented July 28, 1925.

1,547,218

UNITED STATES PATENT OFFICE.

HARRY K. INMAN AND JOHN J. JOHNSON, OF PUEBLO, COLORADO.

BRAKE LINING.

Application filed May 14, 1923. Serial No. 638,949.

*To all whom it may concern:*

Be it known that we, HARRY K. INMAN and JOHN J. JOHNSON, citizens of the United States of America, and residents of Pueblo, in the county of Pueblo and State of Colorado, have invented certain new and useful Improvements in Brake Linings, of which the following is a specification.

This invention relates to brake mechanisms for automobiles and the like, and particularly to means for applying brake linings and securing them in place without the necessity of dismantling parts of the automobile, such as the wheels or the like.

It is an object of this invention to provide a brake lining which may be expeditiously secured in place initially, or after the brake lining has been worn may be removed and replaced by another, it being likewise the purpose of the invention to provide a brake band carrier and permanently attached lining which may be readily removed when the lining has become worn to a point where it will not be efficient.

It is a further object of this invention to produce a brake lining which is associated with a carrier band or retaining device, the latter being of inexpensive construction and to which there is permanently attached a fibrous band or strip constituting the brake lining proper, such as the asbestos lining or one of other material. Those skilled in the art are well aware of the labor and time required for replacing brake linings on automobiles as they have been constructed where the wheels have to be removed or other parts dismantled, to a very great extent, prior to the brake lining being accessible for removal; and it is the object of this invention to facilitate the work of renewing worn brake linings, as stated, without materially adding the cost of a new brake band.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
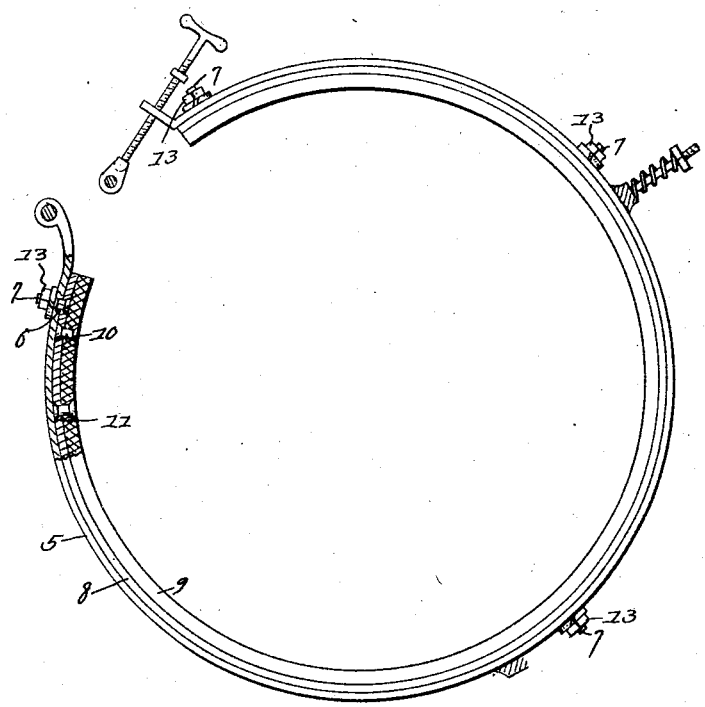
Figure 1 illustrates a view in elevation of a brake band with brake band carrier and its lining embodying our invention, the view being partly in section.
Figure 2:
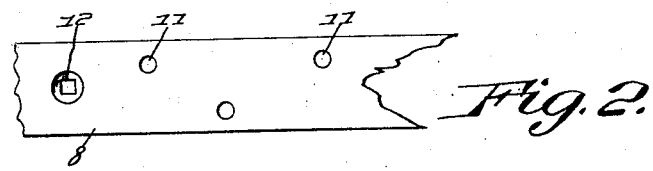
Figure 2 illustrates a plan view of a fragment of the auxiliary brake band carrier.
Figure 3:
Figure 3 illustrates a view in elevation of one of the bolts for connecting the brake band carrier to the brake band.

In carrying the invention into practice, the ordinary brake band 5 will be provided with a series of apertures 6 through which the shanks of bolts 7 may extend, and in the present embodiment of the invention, three or four such bolts are employed as an anchorage for the brake band carrier, which brake band carrier comprises a flexible metal band 8 of appropriate thickness to which the brake lining 9 is secured by rivets such as 10. The metal band 8 has a plurality of apertures 11 near its edges, and the apertures on one edge may be staggered with relation to those on the other edge, or they may be otherwise arranged, according to the requirements in practice. The metal brake band carrier 8 has a series of preferably three or four holes 12 which are angular and shaped to the contour of the bolt near its head, which bolt near its head is polygonal in cross section. The apertures 6 in the brake band may likewise be shaped to the contour of this section of the shank of the bolt, as it will further aid in preventing the rotation of the bolt when the nut 13 is applied to it.

From an inspection of the drawing, it will be apparent that by the removal of the nuts 13, of the bolts 7 the flexible brake band carrier 8 may be removed from the brake band and it in turn will carry the brake lining 9, so that when the band carrier 8 is removed, another brake band carrier and brake lining which is attached thereto may be secured in place quite expeditiously.

In the installation of a new brake band carrier and lining embodying the invention, the usual outer or main brake band may be displaced by removing the cotter key and pin from the lower end of the hand brake adjusting screw and removing the cotter key and pin from the top end of the lower half of the main brake band, an operation which will release both ends of the main brake band. Then by loosening the nuts on the brake band, the carrier band and the worn lining may be removed and a new one substituted therefor using the same bolts which pass through the holes in the main brake band, the cotter pins and keys can be replaced and the brake band can then be adjusted to its new lining.

We claim:

1. In a removable brake lining, comprising a flexible metallic brake band having adjacent to its ends apertures, means for securing the brake lining to the flexible band, bolts projecting through said apertures and the flexible band the bolts having their heads seated between the brake lining and the said band, and means for securing the bolts to a brake band.

2. In a removable brake lining, a brake band, a metallic carrier band having apertures, bolts having heads seated on the inside of the band in countersunk recesses, the shanks thereof projecting through the apertures in the brake band, nuts and lock washers for the bolts, a brake lining, and means for permanently securing the brake lining to the said carrier band.

3. In a removable brake lining, a flexible metallic carrier band having a plurality of apertures along its edges, a brake lining carried by the said band, rivets extending through the apertures of the metallic carrier and through the brake lining for permanently securing the two together, the said metallic carrier having centrally located bolt receiving apertures, and bolts extending through the apertures the heads thereof being interposed between the inner face of the metallic carrier band and the brake lining.

HARRY K. INMAN.
JOHN J. JOHNSON.